March 11, 1924.

L. FRANTZ

MEANS FOR PREVENTING THE THEFT OF AUTOMOBILES

Filed Sept. 13, 1922

1,486,372

Inventor.
Leroy Frantz
By [signature]
Attorney.

Patented Mar. 11, 1924.

1,486,372

UNITED STATES PATENT OFFICE.

LEROY FRANTZ, OF NEW ROCHELLE, NEW YORK.

MEANS FOR PREVENTING THE THEFT OF AUTOMOBILES.

Application filed September 13, 1922. Serial No. 587,884.

*To all whom it may concern:*

Be it known that I, LEROY FRANTZ, a citizen of the United States, and resident of New Rochelle, county of Westchester, State of New York, have invented an Improvement in Means for Preventing the Theft of Automobiles, of which the following is a specification.

The object of my invention is to provide an automobile with means upon its door or body and controlled by a lock and key, by which a plate or surface containing the chassis number and the motor number, or either of them, may be adjusted in view and retained there; and in which further, said plate or surface may be extended and provided with an alarm notice such as would indicate that the machine was stolen, said words to be brought into view and retained in such position by means of a lock, said adjustment to be made whenever the owner of the car leaves it standing in the street or even in the garage. The purpose of these markings is, primarily, to bring into view the chassis and motor numbers, either or both, where they may be easily seen and read in the event of the car being stolen and in that manner facilitate the tracing of and identifying the machine when stolen; and likewise, to provide a notice to the police and other persons that the car has been stolen. When the owner is operating the car, the chassis and motor numbers are in view, but when he leaves the car unattended, the plate is adjusted to bring into view the words "Stop, Stolen," "Investigate if in motion" or other suitable words, so that detection and arrest of the thieves may be accomplished.

My invention broadly comprehends a device for not only interposing an obstruction to the successful theft of automobiles but which will assist in the recovery of a stolen car by facilitating the identification of a stolen car; and embodying a device attached to or built into the auto body showing the chassis number and motor number, either or both, said device arranged upon the car so as to be plainly and easily observed from the outside thereof and which cannot be easily removed or without defacing the body of the car, said device also provided with adjustable means, if desired, to indicate that the car has been stolen, if it should be run off in the temporary absence of the owner.

With the above and other objects in view, the nature of which will be more fully understood from the description hereinafter, the invention consists in the novel construction of devices for retarding theft of automobiles, as hereinafter more fully described and defined in the claims.

Figure 1:
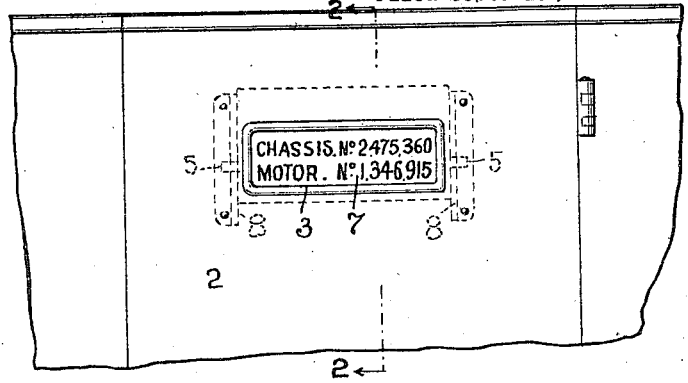
Figure 2:
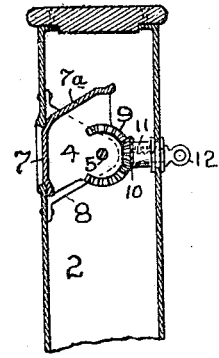
Figure 3:
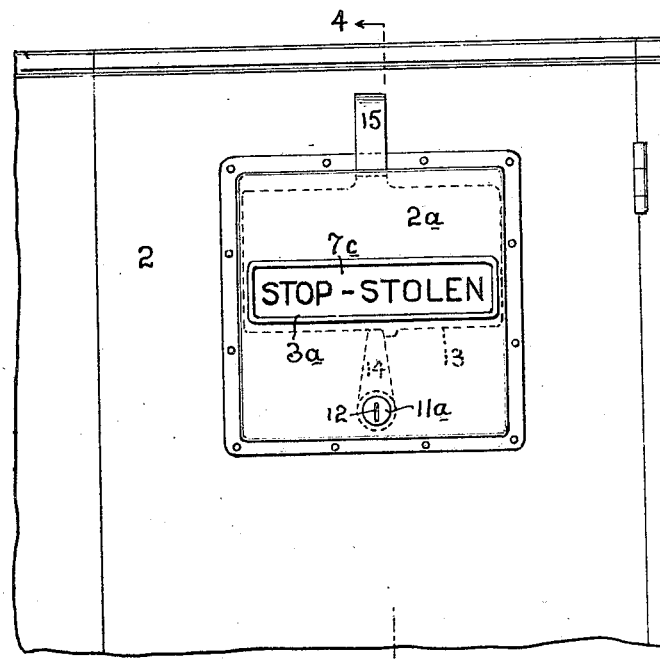
Figure 4:
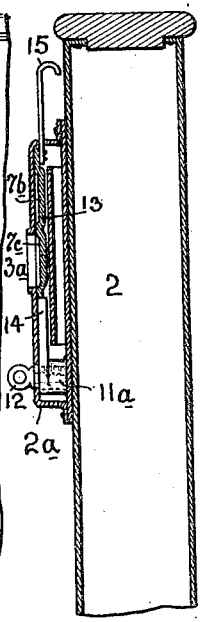
Figure 5:
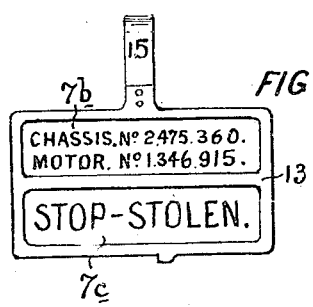

Referring to the drawings: Fig. 1 is a side elevation of the side door portion of an automobile having my improvements applied thereto; Fig. 2 is a vertical section through the same on line 2—2; Fig. 3 is a front view of an automobile door showing a modified construction of my invention; Fig. 4 is a vertical section of the same on line 4—4; and Fig. 5 shows a detail.

Referring first to Figs. 1 and 2, the door is designated by the numeral 2 and may be of any suitable construction and provided near its upper part with a slot 3. Arranged within the body of the door is barrel 4 having journals 5 at each end, said journals supported in a suitable frame 8, whereby it may be rotated. The barrel is also provided with two surface portions 7 and 7$^a$ in one of which is formed the numbers corresponding to the chassis and motor numbers, either or both, and in the other the words denoting theft, as hereinbefore refered to. This barrel snugly fits the aperture or slot 3 which is of a vertical height sufficient to permit either the surface 7 or the surface 7$^a$ being exposed at one time. The barrel 4 may be provided with a bevel gear or segment 9 with which a bevel gear 10 meshes and by which the barrel may be given a part rotation.

The bevel gear 10 is rotated by a key actuated lock 11 and the lock, of the cylinder or other type, definitely holding the pinion 10 and hence the barrel 5 in its two extreme adjusted positions. The key aperture of the lock 11 may open through the inner face of the door so as to be operated by the key 12 from the inside of the door (Fig. 2). In this manner, either of the parts 7 and 7$^a$ may be brought into alinement with the aperture 3 and locked in such adjusted positions.

Where the automobile is already in use, I prefer to provide my improved device in a form which will permit of its being attached to the outer surface of the door or other exposed part of the automobile body, said attachable part containing the adjustable plate providing the chassis and motor numbers and also the notice indicating theft, said plate capable of being adjusted and positively secured in such adjusted positions by a suitable lock. In this instance, the operative parts are enclosed within a casing having an aperture or slot for exposure of the marked portions of the plate; and the casing is firmly riveted or otherwise permanently secured in position. As an example of this adaptation of my invention, I refer to Figs. 3 and 4, in which 2 is the door or other part of the automobile body, $2^a$ is the casing riveted to the same and provided with the slot or window $3^a$, said casing providing a chamber in which the adjustable plate 13 is arranged. More particularly, this plate is arranged to slide vertically and provided with an operating arm 15 projecting upward through the upper part of the case. The plate 13 fits up close to the back of the front plate of the casing in which the slot $3^a$ is formed and contains upon its exposed surface an upper legend setting out the chassis and engine numbers, or either of them, as may be preferred, and a lower legend indicating that the car has been stolen. When the plate is adjusted in a low position, the latter legend is in view through the aperture; and when adjusted to the upper position, the former legend is in view. $11^a$ is a cylinder or other suitable lock built into the casing $2^a$ and adapted to be operated by a key 12, said lock also provided with a bolt 14 which, when turned to an upper position as shown, the plate 13 is locked in its upper adjusted position and displaying the theft legend. The lock bolt 14 may be so connected with the plate 13 as to both raise and lower it by operating the lock $11^a$, in which case the arm 15 may be omitted. Where the bolt 14 is only relied upon to definitely hold the plate 13 when the theft legend is exposed, the arm 15 will be preferably employed to positively lift the plate or to depress it as required. As either the theft legend or the number legend are required to be exposed, the latter will not need to be locked since it will remain exposed by gravity alone and anyone stealing the car would not have any season for shifting the plate to the other position.

Considering the special utility of the invention, aside from the provision of indicating means for notifying an observer that the car had been stolen, the important feature of providing a ready reference to the motor and chassis numbers is also assured, permitting quick identification of the car in case of theft. Heretofore, it was necessary to hunt for the chassis number somewhere on that part of the car whereas the motor number must be looked for on the motor, and such inspection cannot readily be made, especially when the thief is guarding against too close an investigation. As sometimes the motor is substituted by another, it is important that the chassis number be on the plate or barrel in any event. However, my invention will be answered by the plate or barrel being provided with any definite designating mark or identification which may be adopted and I, therefore, do not restrict myself in this respect.

In all cases, the device comprises means built into or permanently attached to the car showing the chassis or motor numbers, either or both, which may be plainly visible from the outside of the car and which cannot be removed without manifestly defacing the car, said device provided, if desired, with adjustment to temporarily expose a legend indicating that the car has been stolen.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent is:

1. An automobile body provided with a chamber open to the outside of the body, combined with an adjustable plate fitted within the chamber and having thereon a number or numbers corresponding to the number of the chassis or motor whereby the automobile may be identified and also having thereon words to indicate that the automobile has been stolen, the shifting of the plate being adapted to bring the numbers or the designating words into view through the opening in the chamber so either may be seen at one time while the other is shielded from view, and means including a lock for shifting the said plate and locking the same in its adjusted position.

2. An automobile body provided with a chamber having an opening to the outside, combined with an adjustable structure within the chamber and having thereon a number or numbers corresponding to the chassis number or motor number or both and also having thereon a legend to indicate that the automobile has been stolen, the adjustment of the structure adapted to bring the numbers or legend into view, and a lock for locking said structure in its adjusted position exposing the legend indicating theft.

In testimony of which invention, I hereunto set my hand.

LEROY FRANTZ.